US012558854B2

(12) United States Patent
Bosboom et al.

(10) Patent No.: US 12,558,854 B2
(45) Date of Patent: Feb. 24, 2026

(54) METHOD FOR ASSEMBLING A ROTOR BLADE OF A WIND TURBINE

(71) Applicant: Siemens Gamesa Renewable Energy Innovation & Technology S.L., Sarriguren (ES)

(72) Inventors: Matthijs Bosboom, Oosterwolde FR (NL); Marina De La Fuente Larrañaga, Irun (ES); Francisco Javier Hierro-Olabarria Salgado, Alava (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 127 days.

(21) Appl. No.: 18/561,238

(22) PCT Filed: May 16, 2022

(86) PCT No.: PCT/EP2022/063146
§ 371 (c)(1),
(2) Date: Nov. 15, 2023

(87) PCT Pub. No.: WO2022/243226
PCT Pub. Date: Nov. 24, 2022

(65) Prior Publication Data
US 2024/0253313 A1 Aug. 1, 2024

(30) Foreign Application Priority Data
May 21, 2021 (EP) ..................................... 21382462

(51) Int. Cl.
B32B 41/00 (2006.01)
B29C 65/00 (2006.01)
(Continued)

(52) U.S. Cl.
CPC ........ B29C 65/344 (2013.01); B29C 66/1162 (2013.01); B29K 2021/003 (2013.01);
(Continued)

(58) Field of Classification Search
CPC ............... B29C 65/344; B29C 66/1162; B29C 65/4815; B29C 65/4835; B29C 65/5057;
(Continued)

(56) References Cited

U.S. PATENT DOCUMENTS 10,138,867 B2 11/2018 Caruso et al.
2017/0074239 A1* 3/2017 Caruso .............. B29C 66/12821

FOREIGN PATENT DOCUMENTS

GB 2463250 A 3/2010

OTHER PUBLICATIONS

PCT International Search Report and Written Opinion of International Searching Authority mailed Aug. 3, 2022 corresponding to PCT International Application No. PCT/EP2022/063146 filed May 16, 2022.

* cited by examiner

*Primary Examiner* — Michael N Orlando
*Assistant Examiner* — Joshel Rivera
(74) *Attorney, Agent, or Firm* — Schmeiser, Olsen & Watts LLP

(57) ABSTRACT

A method for assembling a rotor blade of a wind turbine: a) providing at least two different rotor blade modules that segment the rotor blade along a longitudinal direction thereof, wherein each rotor blade module has a sloped interface section that include a weldable thermoplastic resin and/or a weldable thermoset resin (M, b) providing a resistive element, c) arranging the rotor blade modules and the resistive element in such a way that sloped interface sections face each other and the resistive element is sandwiched
(Continued)

between the sloped interface sections, d) energizing the resistive element to apply heat to a weldable thermoplastic resin and/or the weldable thermoset resin to melt or to soften it, and e) joining the sloped interface sections together at a joint by means of the molten or softened weldable thermoplastic resin and/or the weldable thermoset resin to form the rotor blade.

14 Claims, 12 Drawing Sheets

(51) Int. Cl.

| | |
|---|---|
| *B29C 65/34* | (2006.01) |
| *B29K 21/00* | (2006.01) |
| *B29L 31/08* | (2006.01) |
| *F03D 1/06* | (2006.01) |

(52) U.S. Cl.
CPC ....... *B29L 2031/085* (2013.01); *F03D 1/0677* (2023.08); *F05B 2230/232* (2013.01); *F05B 2240/302* (2013.01)

(58) Field of Classification Search
CPC . B29C 65/342; B29C 65/3468; B29C 66/721; B29C 66/73921; B29C 66/73941; B29C 65/3476; B29C 65/3492; B29C 66/7212; B29C 66/72141; B29C 66/112; B29C 66/131; B29C 66/14; B29C 66/524; B29C 66/54; B29C 66/612; B29C 66/636; B29K 2021/003; B29K 2309/08; B29K 2307/04; B29L 2031/085; F03D 1/0677; F03D 1/0675; F05B 2230/232; F05B 2240/302; Y02E 10/72; Y02P 70/50
USPC ................... 156/60, 64, 350, 351, 378, 379
See application file for complete search history.

FIG 5
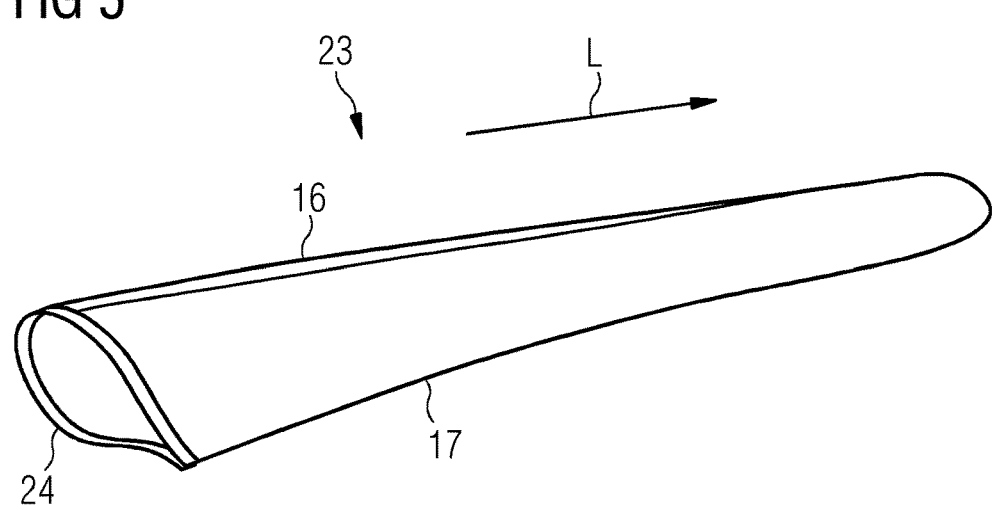
FIG 6
FIG 7
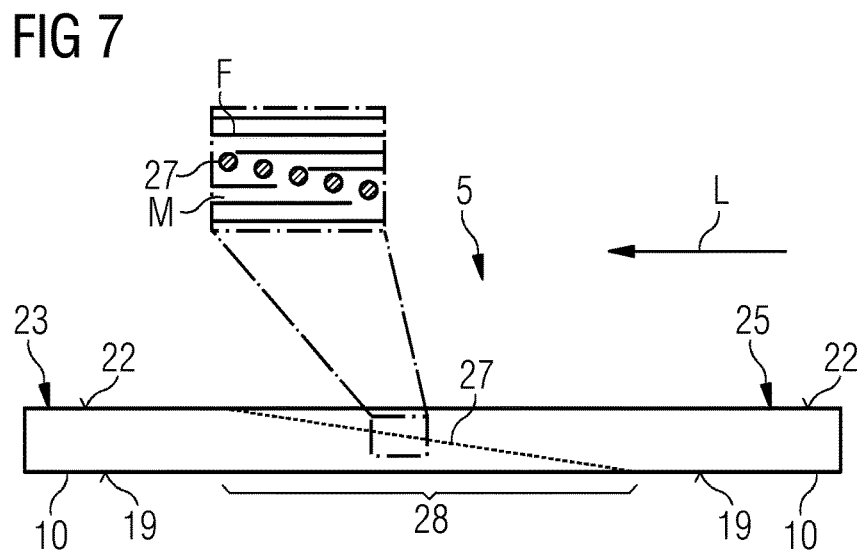

METHOD FOR ASSEMBLING A ROTOR BLADE OF A WIND TURBINE

CROSS-REFERENCE TO RELATED APPLICATIONS

This application claims priority to PCT Application No. PCT/EP2022/063146, having a filing date of May 16, 2022, which claims priority to EP Application No. 21382462.6, having a filing date of May 21, 2021, the entire contents both of which are hereby incorporated by reference.

FIELD OF TECHNOLOGY

The following relates to a method for assembling a rotor blade of a wind turbine.

BACKGROUND

A trend in the wind energy sector is to produce longer rotor blades to reduce the cost of energy. This causes big challenges in terms of transportation and handling of the rotor blades to and on the installation sites. This can highly increase the logistics costs. To mitigate this issue, segmented, split, or modular rotor blade designs can be used. These designs are based on tailored connection solutions between different substructures. With this concept, multiple rotor blade segments can be transported separately.

The options for joining hollow structures of rotor blades in-field are so far detachable mechanical joints using T-bolts, stud connections or fasteners that can lead to rusting problems, lightening attraction, and high weight of the joint. Even if they are fast and easy to assemble, they need some maintenance and are expensive. Adhesive bonds may provide structural and economic efficiency. However, in-field assembly poses a big issue in terms of high installation costs due to the need for specialized equipment and added time consuming tasks during on-site assembly for a high-quality bond.

SUMMARY

An aspect relates to provide an improved method for assembling a rotor blade of a wind turbine.

Accordingly, a method for assembling a rotor blade of a wind turbine is provided. The method comprises the following steps: a) providing at least two different rotor blade modules that segment the rotor blade along a longitudinal direction thereof, wherein each rotor blade module has a sloped interface section, and wherein the sloped interface sections comprise a weldable thermoplastic resin and/or a weldable thermoset resin, b) providing a resistive element, c) arranging the rotor blade modules and the resistive element in such a way that the sloped interface sections face each other and the resistive element is sandwiched between the sloped interface sections, d) energizing the resistive element to apply heat to the weldable thermoplastic resin and/or the weldable thermoset resin to melt or to soften it, and e) joining the sloped interface sections together at a joint by means of the molten or softened weldable thermoplastic resin and/or the weldable thermoset resin to form the rotor blade.

Due to the use of the resistive element and the weldable thermoplastic resin and/or the weldable thermoset resin, it is possible to join the rotor blade modules together very fast and without the need of curing an epoxy resin. The rotor blade can be divided or segmented into the rotor blade modules and assembled on the construction side. This improves the transportability of the rotor blade because the rotor blade modules can be transported easier than the entire rotor blade. The sloped shape of the sloped interface sections provides an increased surface for connecting the rotor blade modules at the sloped interface sections.

In comparison to structural adhesive joints, the cycle time of the method as explained before will be an order of magnitude lower than standard joining processes. The process of joining the rotor blade modules can be fully finished in seconds. No additional materials are added at any point of the method. The resulting rotor blade will be as recyclable as a matrix material used for the rotor blade modules. In the case of a thermoplastic resin this might mean a 100% recovery of the resin.

The mechanical performance of the joint is also improved since a gap between the rotor blade modules can become lower as there is no need to fill with a foreign paste material and the resulting laminate will be a homogeneous structure. The ability to create a microstructurally continuous laminate in a very short cycle time enables the modularity of blade designs. This makes it possible to avoid using current full-size molds that can disrupt the current design and manufacturing of rotor blades.

The method is a welding method for welding together the rotor blade modules. Thus, the method can be named welding method. The method steps a) to e) can be performed subsequently or at least partly simultaneously. The rotor blade is segmented. "Segmented" in this context means that the rotor blade can be divided along its longitudinal direction into the rotor blade modules that can be joined together to form the rotor blade by means of the method on the construction side. "Rotor blade module" in this context means that the rotor blade comprises a plurality of modules, sub-modules or components that form together the rotor blade.

After joining the rotor blade modules in step e), the rotor blade modules are arranged side by side along the longitudinal direction. The number of rotor blade modules is arbitrary. There are provided at least two rotor blade modules. The rotor blade extends along the longitudinal direction from a blade root to a blade tip. The rotor blade modules can comprise a rotor blade main module comprising the blade root and a rotor blade tip module comprising the blade tip. The rotor blade tip module can be referred to as first rotor blade module. The rotor blade main module can be referred to as second rotor blade module. Each rotor blade module can have a length of several meters. Providing the rotor blade modules can comprise manufacturing the rotor blade modules.

The rotor blade modules can be made of a fiber reinforced plastic or resin material. The rotor blade modules are made of a glass fiber reinforced material. A glass fiber reinforced material comprises a matrix or matrix material and glass fibers being embedded in the matrix material. The matrix material can be the same as the weldable thermoplastic resin and/or the weldable thermoset resin used for the interface sections. Thus, the weldable thermoplastic resin and/or the weldable thermoset resin can be referred to as matrix or matrix material and vice versa.

"Weldable" in this context means that the thermoplastic resin and/or the thermoset resin can be molten or at least softened by applying heat. A thermoplastic resin or thermosoftening resin is a plastic polymer material that becomes pliable or moldable at a certain elevated temperature and solidifies upon cooling. A thermosetting polymer, resin, or plastic, often called a thermoset, is a polymer that is irreversibly hardened by curing from a soft solid or viscous liquid prepolymer or resin. In contrast to this, a weldable thermoset resin is a material that can at least be softened by applying heat so that the weldable thermoset resin can be used to weld together the sloped interface sections.

The rotor blade and the rotor blade modules can be made of a first half-shell and second half-shell being connected at a leading edge and a trailing edge forming an outer blade shell of the rotor blade or the rotor blade modules. The outer blade shell encompasses an inner space of the rotor blade or the blade modules. Stiffeners or other structural elements can be arranged within the inner space. The outer blade shell or the half-shells have inner surfaces facing the inner space and outer surfaces facing away from the inner space. These surfaces can be referred to as surfaces of the rotor blade itself.

"Sloped" interface section in this context means that the interface section is inclined in an inclination angle towards one of the afore mentioned inner surfaces or outer surfaces of the rotor blade. The sloped shape of the interface sections can be produced by forming a layer of fabric material that is arranged in a staircase-shape, i.e., on top of each other and with an offset to each other.

"Resistive element" in this context means an element that is electrically conductive and can produce heat by means of the Joule effect. The heat is produced by an electrical current that is applied to the resistive element. A power source can be used to energize the resistive element. The power source can be a battery, a generator or the like. "Energizing" the resistive element in this context means applying the electrical current to the resistive element. The resistive element can have connection points for electrically connecting the power source to the resistive element. "Providing" the resistive element can include manufacturing the resistive element.

"Sandwiching" the resistive element between the sloped interface sections means that the resistive element is arranged as an external part between the sloped interface sections that have to be joined together. Alternatively, the resistive element can be part of at least one of the sloped interface sections. That the sloped interface sections "face" each other includes that the sloped interface sections lay against each other or rest on each other. However, resting or laying against each other does not exclude that the resistive element is placed between the sloped interface sections that have to be connected.

In step e) the joint between the sloped interface sections is produced by cooling down the molten or softened weldable thermoplastic resin and/or the weldable thermoset resin to form the rotor blade. In case of a weldable thermoplastic resin, the weldable thermoplastic resin solidifies or freezes by cooling down to form the joint. In case of a weldable thermoset resin, the weldable thermoset resin chemically reacts and/or solidifies to form the joint.

According to an embodiment, the resistive element is embedded in at least one of the sloped interface sections.

This can mean that the resistive element is part of at least one of the sloped interface sections. Alternatively, all the sloped interface sections can have a resistive element of that kind. "Embedded" in this context can mean that the resistive element is placed below or on a surface of the sloped interface section or the sloped interface sections. "Embedded" can also mean that the resistive element is at least partly covered by or impregnated with the weldable thermoplastic resin and/or the weldable thermoset resin of the sloped interface section or the sloped interface sections.

According to a further embodiment, the resistive element has the form of wires or a mesh.

The resistive element can be made of a metal. For example, the resistive element is made of copper, silver, aluminum, or the like. Alternatively, the resistive element can be made of carbon fibers. The resistive element can be a woven fabric made of carbon fibers or the like.

According to a further embodiment, a resin strip comprising a weldable thermoplastic resin and/or a weldable thermoset resin is placed between the sloped interface sections during step c).

The resin strip is used to close a gap between the sloped interface sections that have to be joined or welded. The gap can result from tolerance mismatches. The resin strip is not reinforced by means of reinforcement fibers. The resin strip can comprise the resistive element. The resistive element can be embedded in the resin strip. The weldable thermoplastic resin and/or the weldable thermoset resin of the resin strip is the same as the weldable thermoplastic resin and/or the weldable thermoset resin used for the rotor blade modules or the sloped interface sections.

According to a further embodiment, pressure is applied to the sloped interface sections during step d) and/or e).

The pressure presses the sloped interface sections together, so that the molten or softened weldable thermoplastic resin and/or the weldable thermoset resin of the interface sections form the joint between the sloped interface sections.

According to a further embodiment, the pressure is applied by means of a mold that covers the joint.

In particular, the pressure is applied by means of a clamping system integrated into the mold. The clamping system comprises clamps being provided at a lower mold shell and an upper mold shell. Furthermore, pneumatic or hydraulic cylinders can be provided to apply the pressure to the mold shells by means of the clamps. In the case that there is produced more than one joint, a mold arrangement comprising a plurality of molds can be used. These molds are then placed in a distance from each other along the longitudinal direction covering the joints.

According to a further embodiment, a first joint is formed during step e), wherein the first joint runs perpendicular to the longitudinal direction, and wherein the first joint runs around a circumference of an outer blade shell of the rotor blade.

The first joint is a scarf joint. Thus, the first joint can also be named first scarf joint. The first joint is circumferentially closed. This means that the first joint runs around the complete perimeter or circumference of the outer blade shell. The first joint is produced by connecting first sloped interface sections together. The first sloped interface sections are provided at ends of the rotor blade modules that have to be connected. The first sloped interface sections run perpendicular to the longitudinal direction and around the circumference of the outer blade shell. The first sloped interface sections comprise a continuous, in particular a band-shaped, geometry. "Continuous" in this context means that the first sloped interface sections are not interrupted. The first sloped interface sections run around a complete circumference or perimeter of the rotor blade, the corresponding rotor blade module, or the outer blade shell.

According to a further embodiment, a second joint is formed during step e), wherein the second joint runs parallel to the longitudinal direction, and wherein the second joint runs along a spar cap of the rotor blade.

More than one spar cap is provided. The spar caps have second sloped interface sections that run along the longitudinal direction. Thus, the first sloped interface sections and the second sloped interface sections are arranged perpendicular to each other.

According to a further embodiment, the first joint is formed between first sloped interface sections of the rotor blade modules, wherein the second joint is formed between second sloped interface sections of the rotor blade modules, and wherein the first sloped interface sections are steeper than the second sloped interface sections.

"Steeper" in this context means that the afore-mentioned inclination angle of the first sloped interface sections is bigger than that of the second sloped interface sections.

According to a further embodiment, the first sloped interface sections have a thickness/length ratio of 1/8, wherein the second sloped interface sections have a thickness/length ratio of 1/100.

A thickness/length ratio of 1/8 for the first sloped interface sections means that the thickness of the first sloped interface sections reduces by 1 mm along a length of 8 mm. The same applies to the second sloped interface sections.

According to a further embodiment, a transversal stiffener that runs perpendicular to the longitudinal direction is provided for supporting the sloped interface sections from an inner space of the rotor blade.

In particular, the transversal stiffener supports the first sloped interface sections. The transversal stiffener generates a counterpressure from the inner space when the pressure is applied by means of the mold from the outside. Thus, the first sloped interface sections are pressed together evenly. The transversal stiffener supports one of the first sloped interface sections of the rotor blade modules that have to be connected. The transversal stiffener can be inserted into the corresponding rotor blade module during step a) or c).

According to a further embodiment, a longitudinal stiffener that runs parallel to the longitudinal direction is provided for supporting the sloped interface sections from the inner space of the rotor blade.

The longitudinal stiffener can have an I-shape or double T-shape. In particular, the longitudinal stiffener supports the second sloped interface sections. The longitudinal stiffener generates a counterpressure from the inner space when the pressure is applied by means of the mold from the outside. Thus, the second sloped interface sections are pressed together evenly. The longitudinal stiffener can be inserted into the corresponding rotor blade module during step a) or c).

According to a further embodiment, the transversal stiffener and the longitudinal stiffener together form a preassembled joining component that is inserted into the rotor blade modules during step a) or c).

The rotor blade modules and the joining component can be transported to the construction site as separate components.

According to a further embodiment, the resistive element is covered by an insulating material, wherein the insulating material comprises a weldable thermoplastic resin and/or a weldable thermoset resin.

The insulating material prevents arching when energizing the resistive element. The weldable thermoplastic resin and/or the weldable thermoset resin of the insulating material is the same as the one used for the sloped interface sections.

According to a further embodiment, the resistive element remains in the rotor blade after step e).

This means that the resistive element is an integral part of the rotor blade. The resistive element is thus not removed from the rotor blade after joining the rotor blade modules together. The resistive element can function as reinforcement material.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein:

FIG. 5 shows a schematic perspective view of a rotor blade module according to one embodiment;

FIG. 6 shows a schematic cross-sectional view of the rotor blade according to FIG. 2;

FIG. 7 shows a further schematic cross-sectional view of the rotor blade according to FIG. 2;

DETAILED DESCRIPTION

Figure 1:
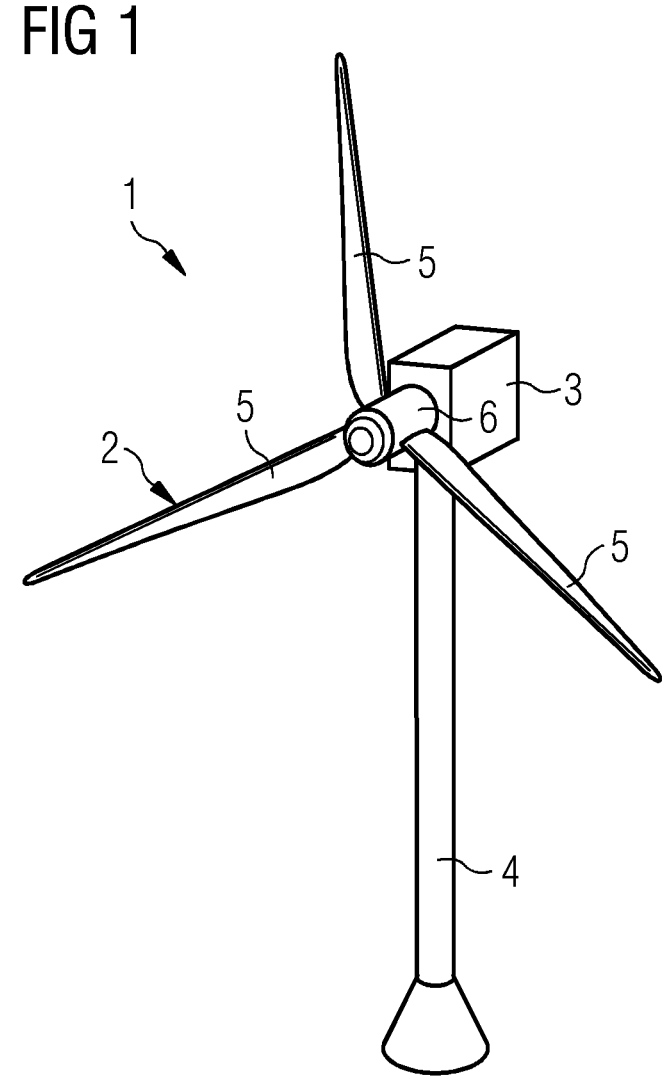
FIG. 1 shows a schematic perspective view of a wind turbine according to one embodiment.

In the Figures, like reference numerals designate like or functionally equivalent elements, unless otherwise indicated.

FIG. 1 shows a wind turbine 1 according to one embodiment.

"Wind turbine" presently refers to an apparatus converting the wind's kinetic energy into rotational energy, which may again be converted to electrical energy by the apparatus.

The wind turbine 1 comprises a rotor 2 connected to a generator (not shown) arranged inside a nacelle 3. The nacelle 3 is arranged at the upper end of a tower 4 of the wind turbine 1.

The rotor 2 comprises three rotor blades 5. The rotor blades 5 are connected to a hub 6 of the wind turbine 1. Rotors 2 of this kind may have diameters ranging from, for example, 30 to 160 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. Oftentimes, glass fibers in the form of unidirectional fiber mats are used.

Figure 2:
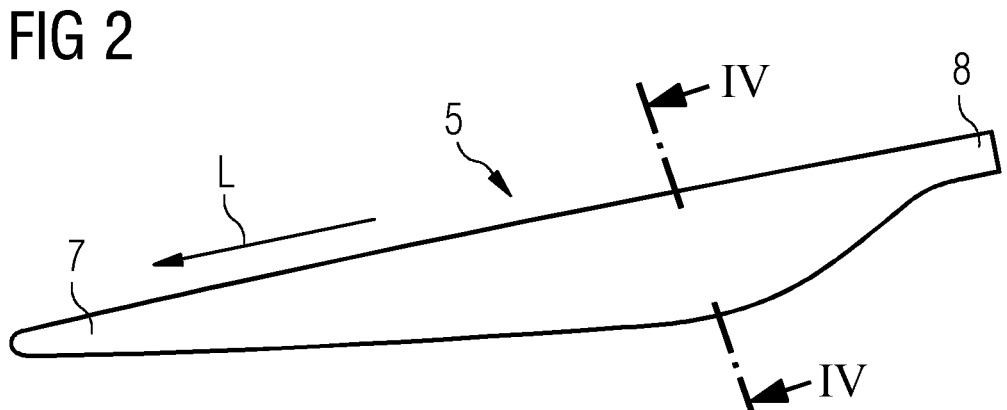
FIG. 2 shows a schematic perspective view of a rotor blade according to one embodiment.

FIG. 2 shows a rotor blade 5 according to one embodiment.

The rotor blade 5 comprises an aerodynamically designed portion 7, which is shaped for optimum exploitation of the wind energy and a blade root 8 for connecting the rotor blade 5 to the hub 6. The rotor blade 5 comprises a longitudinal direction L. The longitudinal direction L is directed from the blade root 8 in direction of the aerodynamically designed portion 7. However, the longitudinal direction L can be oriented vice versa.

These rotor blades 5 are hollow composite structures intended to be as lightweight and stiff as possible to maximize the mechanical energy transfer from wind to the generator. To manufacture the hollow structure, the universally most used materials are composite materials where a reinforcement fiber is embedded into a polymeric matrix.

Figure 3:
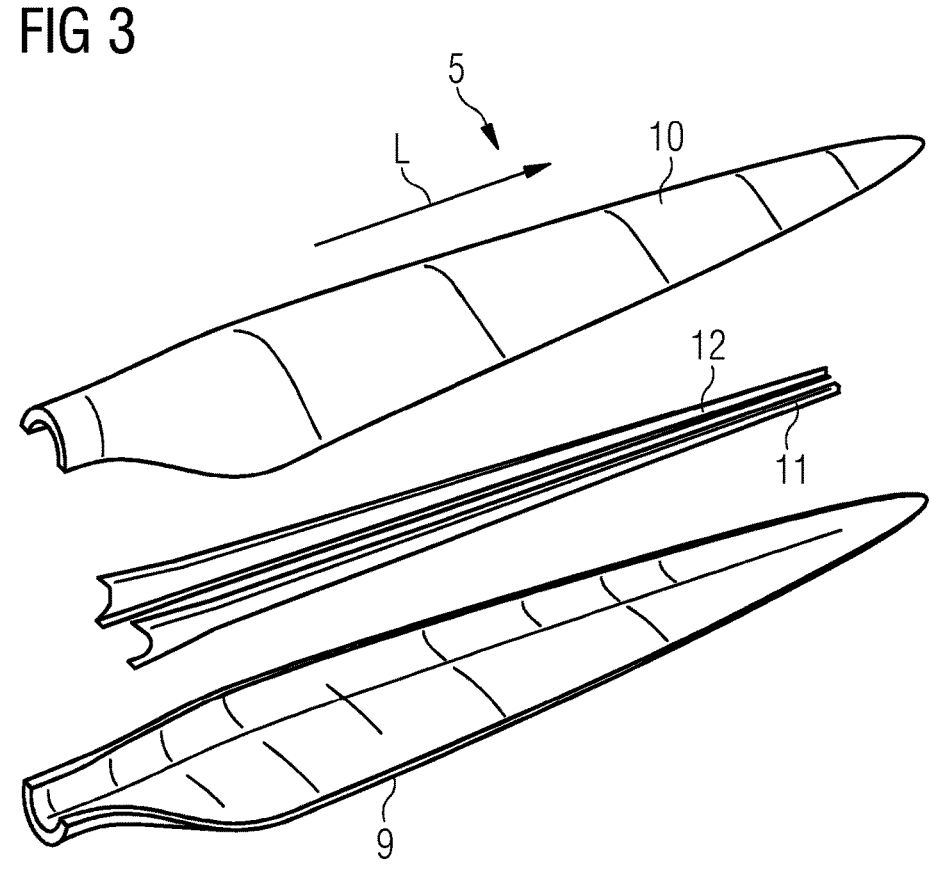
FIG. 3 shows a schematic exploded view of the rotor blade according to FIG. 2.

FIG. 3 shows an exploded perspective view of the rotor blade 5.

The options for joining, bonding, or welding the hollow structures of the rotor blade 5 are so far limited to either create the entire structure in a one-shot molding process which is technically complex and requires specialized tooling or join sub-parts—most commonly blade half-shells 9, 10—by means of an adhesive bonding process performed using also a thermoset material.

Figure 4:
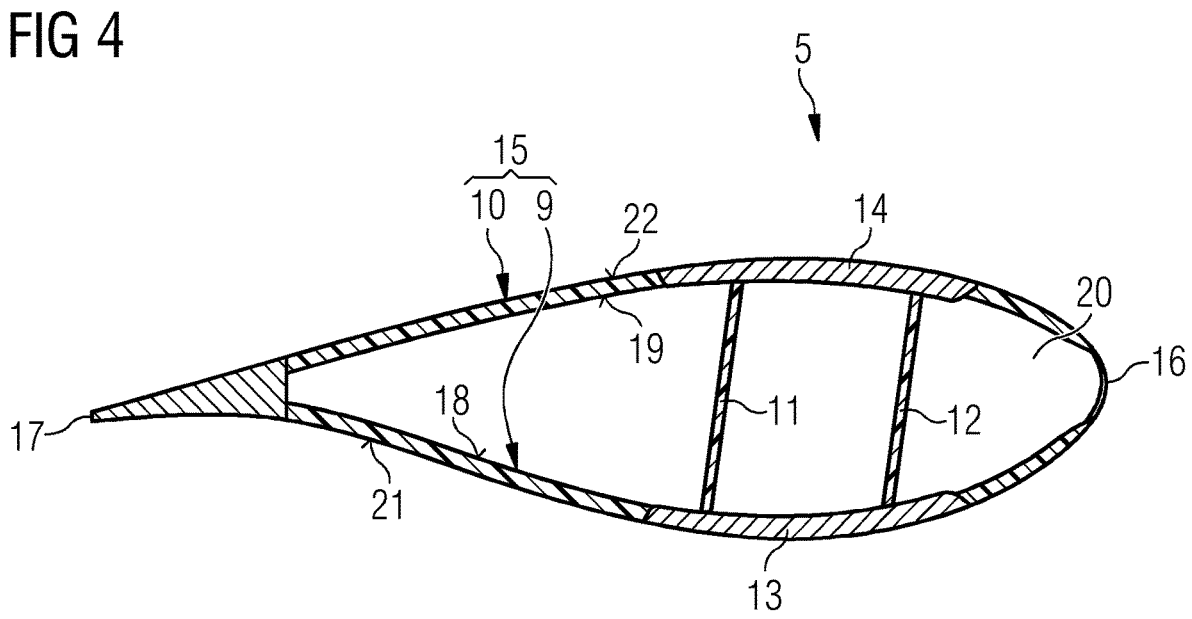
FIG. 4 shows a schematic cross-sectional view of the rotor blade along the intersection line IV-IV of FIG. 2.

A first half-shell 9 of the rotor blade 5 is manufactured and cured in parallel to a second half-shell 10. Then both half-shells 9, 10 and additional structural elements 11, 12, such as shear webs, are joined together using said adhesive bonding process. The half-shells 9, 10 can have integrated spar caps 13, 14 (FIG. 4). More general, the half-shells 9, 10, the structural elements 11, 12, and the spar caps 13, 14 can be named "components" of the rotor blade 5.

FIG. 4 shows a cross-sectional view of the rotor blade 5 according to the intersection line IV-IV in FIG. 2.

The rotor blade 5 has an outer blade shell 15 comprising the first half-shell 9 and the second half-shell 10, which are connected to each other at a leading edge 16 of the rotor blade 5. The half-shells 9, 10 are also connected to each other at a trailing edge 17 of the rotor blade 5. The outer blade shell 15 may comprise composite fiber material, in particular glass fiber mats. The fiber material is impregnated with a polymer material, in particular with thermoplastic or weldable thermoset resin. The first half-shell 9 constitutes a pressure side of the rotor blade 5. The second half-shell 10 constitutes a suction side of the rotor blade 5.

The first half-shell 9 comprises an inner surface 18 and the second half-shell 10 comprises an inner surface 19 being arranged opposite to each other and facing each other. An inner space 20 of the rotor blade 5 is defined by means of the inner surfaces 18, 19. The first half-shell 9 comprises an outer surface 21 that faces away from the inner surface 18. The second half-shell 10 comprises an outer surface 22 that faces away from the inner surface 19. The structural elements 11, 12 are located inside the inner space 20 extending from the inner surface 18 of the first half-shell 9 to the inner surface 19 of the second half-shell 10.

The structural elements 11, 12 and the spar caps 13, 14 run in the longitudinal direction L. The structural elements 11, 12 and the spar caps 13, 14 comprise fiber composite material, in particular glass fiber mats. The structural elements 11, 12 are shear webs.

FIG. 5 shows a schematic perspective view of one embodiment of a rotor blade module 23 of the rotor blade 5.

The rotor blade module 23 can be referred to as first rotor blade module. To enhance the transportability of the rotor blade 5, it is segmented or separated into a plurality of rotor blade modules 23 that can be connected together to form the rotor blade 5. In particular, FIG. 5 shows a blade tip or rotor blade tip module. The rotor blade module 23 has an interface section 24 that is sloped and runs around a complete circumference or perimeter of the rotor blade module 23.

The interface section 24 can be referred to as sloped interface section. The sloped shape of the interface section 24 can be produced by forming a layer of fabric material that is arranged in a staircase-shape, i.e., on top of each other and with an offset from each other. By means of the interface section 24, the rotor blade module 23 can be joined to a further rotor blade module (not shown in FIG. 5).

The interface section 24 comprises a weldable resin as the matrix of the composite material in the interface section 24. "Weldable" in this context means that the matrix can be molten or at least softened to join the interface section 24 to another rotor blade module. The matrix can be a thermoplastic material as well as a duroplastic material. The matrix can be used for the whole rotor blade 5 or only for the interface section 24. In the latter case, the rest of the rotor blade 5 can be produced as a standard blade.

FIGS. 6 and 7 both show cross-sectional views of the rotor blade 5 being cut perpendicular to the interface section 24. FIG. 7 also shows a detail view. In the following, FIGS. 6 and 7 will be referred to at the same time.

Apart from the rotor blade module 23, of which only the second half-shell 10 is shown, the rotor blade 5 comprises a further rotor blade module 25. The number of rotor blade modules 23, 25 is arbitrary. However, there are at least two rotor blade modules 23, 25. The rotor blade module 25 can be referred to as rotor blade main module or rotor blade main body. The rotor blade module 25 can comprise the blade root 8. The rotor blade module 25 can also be referred to as second rotor blade module.

The rotor blade module 25 has an interface section 26 that corresponds to the interface section 24 of the rotor blade module 23. In other words, the interface section 26 is sloped, too. Thus, the interface section 26 can be referred to as sloped interface section. The interface sections 24, 26 can be referred to as first interface sections. "Sloped" in this context means that the interface section 24 is inclined in an inclination angle α towards the inner surface 19. Consequently, the interface section 26 is inclined in an inclination angle β towards the outer surface 22.

The rotor blade 5 can be assembled by joining the rotor blade modules 23, 25 at the interface sections 24, 26. This can be done by inserting the interface section 24 of the rotor blade module 23 into the corresponding interface section 26 of the rotor blade module 25 as shown in FIG. 6. This process is carried out in the absence of any pressure application. It is done by using a simple transportation tool.

A resistive element 27 is placed between the interface sections 24, 26. "Resistive element" in this context means that the resistive element 27 has an electrical resistance and can thus be heated up by applying an electrical current to the resistive element 27. The resistive element 27 is a mesh or comprises a mesh. For example, the resistive element 27 can be made from metal, for example copper, or any other electrical conducting material like carbon fiber. The resistive element 27 can be made of a carbon weaved fabric.

The resistive element 27 can be placed between the interface sections 24, 26 as an additional component. However, the resistive element 27 can also be integrated in at least one of the interface sections 24, 26. In this case, the resistive element 27 is embedded in the matrix of at least one of the interface sections 24, 26. However, both interface sections 24, 26 can have a resistive element 27. Additionally, a further resistive element 27 can be placed between the interface sections 24, 26 in the form of an additional component.

Both rotor blade modules 23, 25 and/or both interface sections 24, 26 comprise reinforcement fibers F that are embedded in a weldable thermoplastic resin and/or a weldable thermoset resin M. The weldable thermoplastic resin and/or weldable thermoset resin M can be referred to as matrix or matrix material. In other words, the term "thermoplastic resin and/or weldable thermoset resin" can be replaced by the term "matrix" or "matrix material" and vice versa.

Then, the resistive element 27 is energized. This can be done by applying an electrical current to the resistive element 27. The electrical current heats the resistive element 27 by means of the Joule effect. The resistive element 27 heats up and applies heat H to both of the interface sections 24, 26. Due to the heat H, the matrix of the interface sections 24, 26 is heated to the point of local melting or at least softened.

To create a joint 28 (FIG. 7) between the interface sections 24, 26 or the rotor blade modules 23, 25, pressure p is applied to both sides of the rotor blade modules 23, 25. 2 to 5 bars of pressure p can be applied, for example. The joint 28 can be referred to as first joint. The pressure p is also needed to avoid unwanted deformations in the area of the joint 28.

The pressure p can be applied by means of a mold (not shown) or the like. The electrical current is stopped, and the pressure p is removed resulting in a homogeneous laminate in the joint 28. The resistive element 27 is not removed from the joint. 28. The resistive element 27 is left within the joint 28. The joint 28 is a scarf joint and can thus be referred to as scarf joint.

Given that the rotor blade 5 is formed by the closed outer blade shell 15, it is not possible to apply perimetral pressure p from the inner space 20 of the rotor blade 5 once the rotor blade modules 23, 25 to be joined are placed together for the final welding as explained before.

Figure 8:
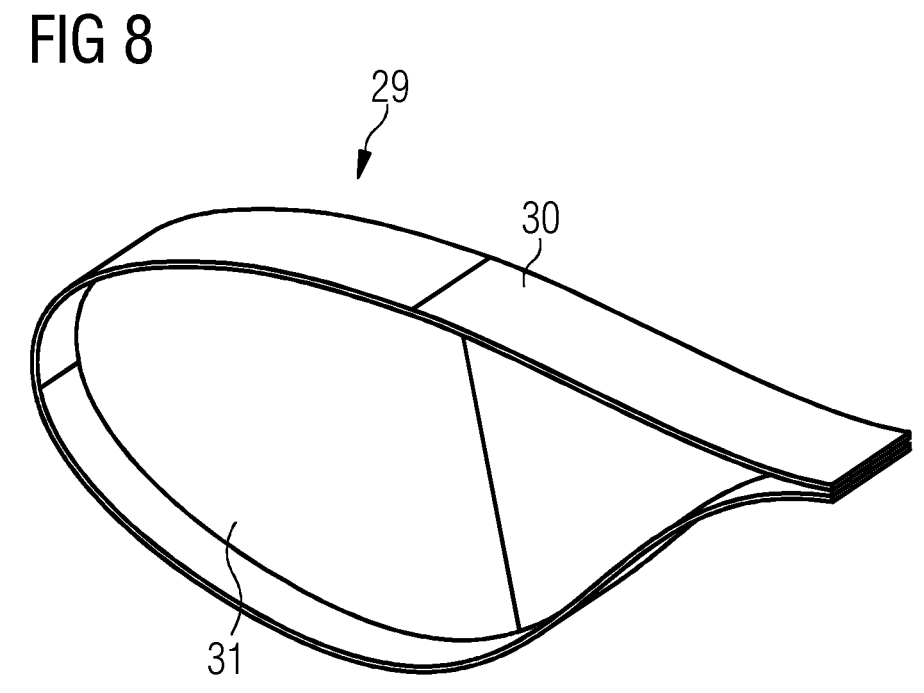
FIG. 8 shows a schematic perspective view of a transversal stiffener according to one embodiment.
Figure 9:
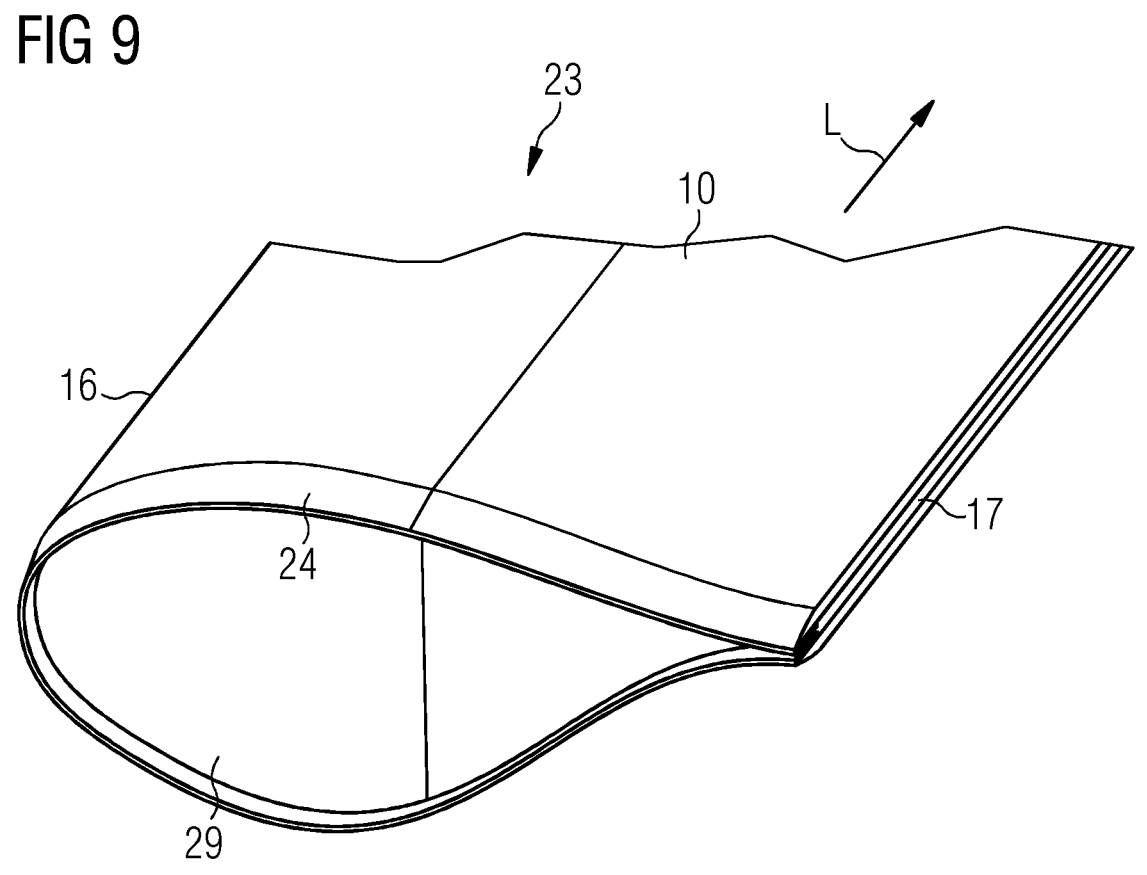
FIG. 9 shows a further schematic perspective view of the rotor blade module according to FIG. 5.

FIG. 8 shows a schematic perspective view of one embodiment of a transversal stiffener 29. FIG. 9 shows a schematic perspective view of the rotor blade module 23 comprising the transversal stiffener 29. In the following, FIGS. 8 and 9 will be referred to at the same time.

The transversal stiffener 29 can be made of glass fiber reinforced plastic or the like. The transversal stiffener 29 comprises a band-shaped flange 30 and a plate-shaped web 31. The flange 30 runs around the web 31 circumferentially.

The transversal stiffener 29 is placed inside the rotor blade module 23, in particular inside the interface section 24. The transversal stiffener 29 has a negative shape of the section where the rotor blade 5 is split and needs to be joined.

This placing of the transversal stiffener 29 in the rotor blade module 23 is done at the manufacturing stage of the rotor blade module 23. The transversal stiffener 29 may be placed at the exact position by means of a positioning jig. Ideally, the transversal stiffener 29 is welded with its flange 30 to the interface section 24 of the rotor blade module 23. However, the transversal stiffener 29 can also be placed in the rotor blade module 23 in the field or construction site of the wind turbine 1. This can be done by means of a room temperature curing adhesive or resin.

Figure 10:
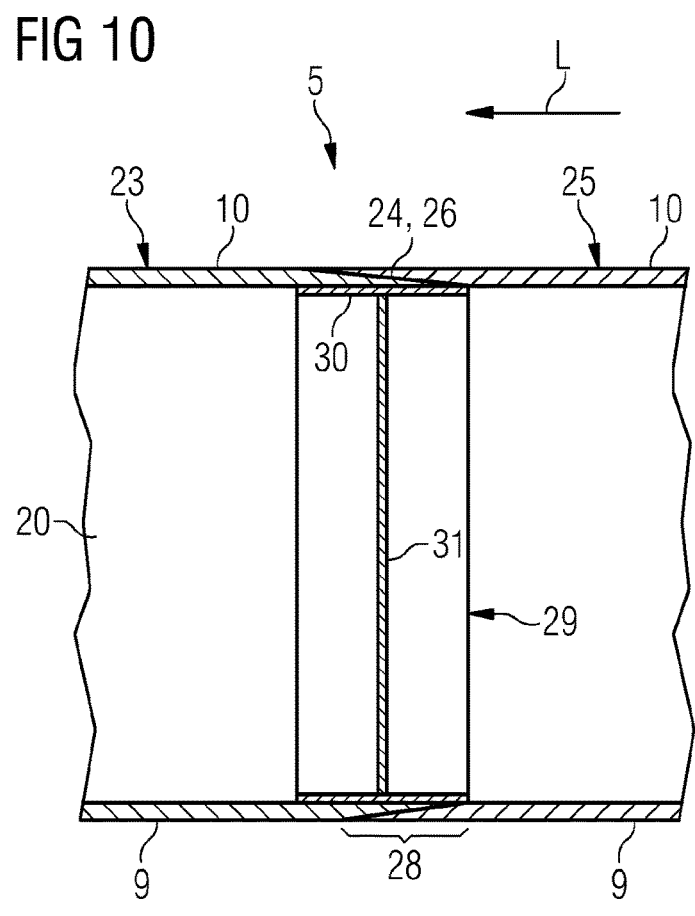
FIG. 10 shows a further schematic cross-sectional view of the rotor blade according to FIG. 2.

FIG. 10 shows a cross-sectional view of the rotor blade 5.

As can be seen from FIG. 10, the transversal stiffener 29 has a T-shaped profile. The flange 30 has at least the width of the interface sections 24, 26 or the joint 28 to fully support the interface sections 24, 26. The web 31 of the transversal stiffener 29 can comprise a sandwich laminate that is designed to withstand the compression pressure p (FIG. 6) during the welding process as explained before and the blade shearing loads in service of the rotor blade 5. The transversal stiffener 29 might be used for the welded joint 28 during blade service, providing the function of diminishing the running loads lasting on the joint 28.

Figure 11:
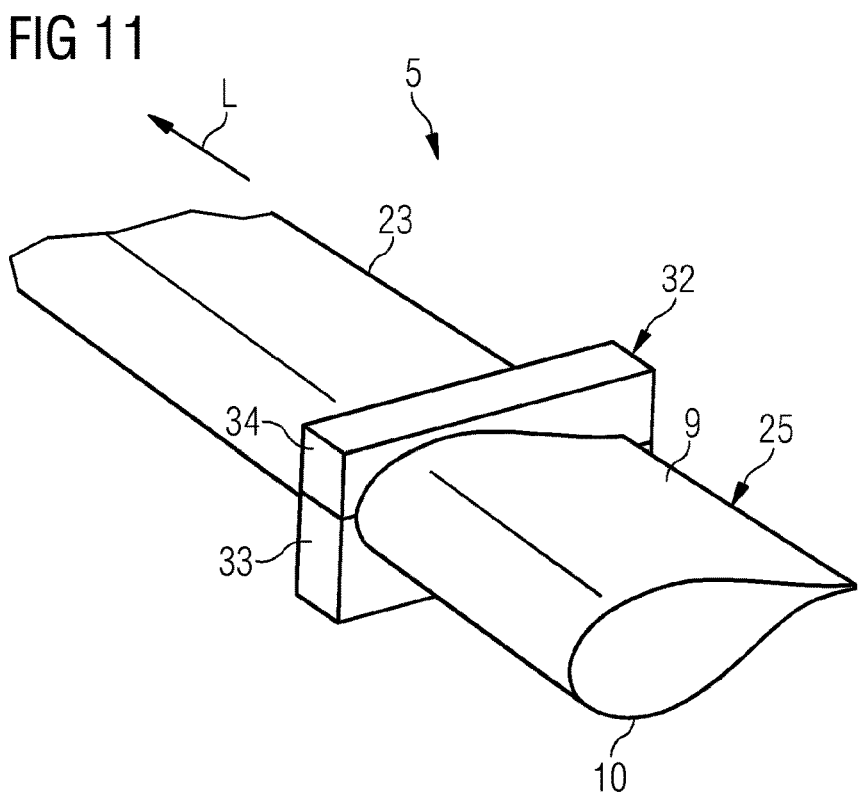
FIG. 11 shows a further schematic perspective view of the rotor blade according to FIG. 2.
Figure 12:
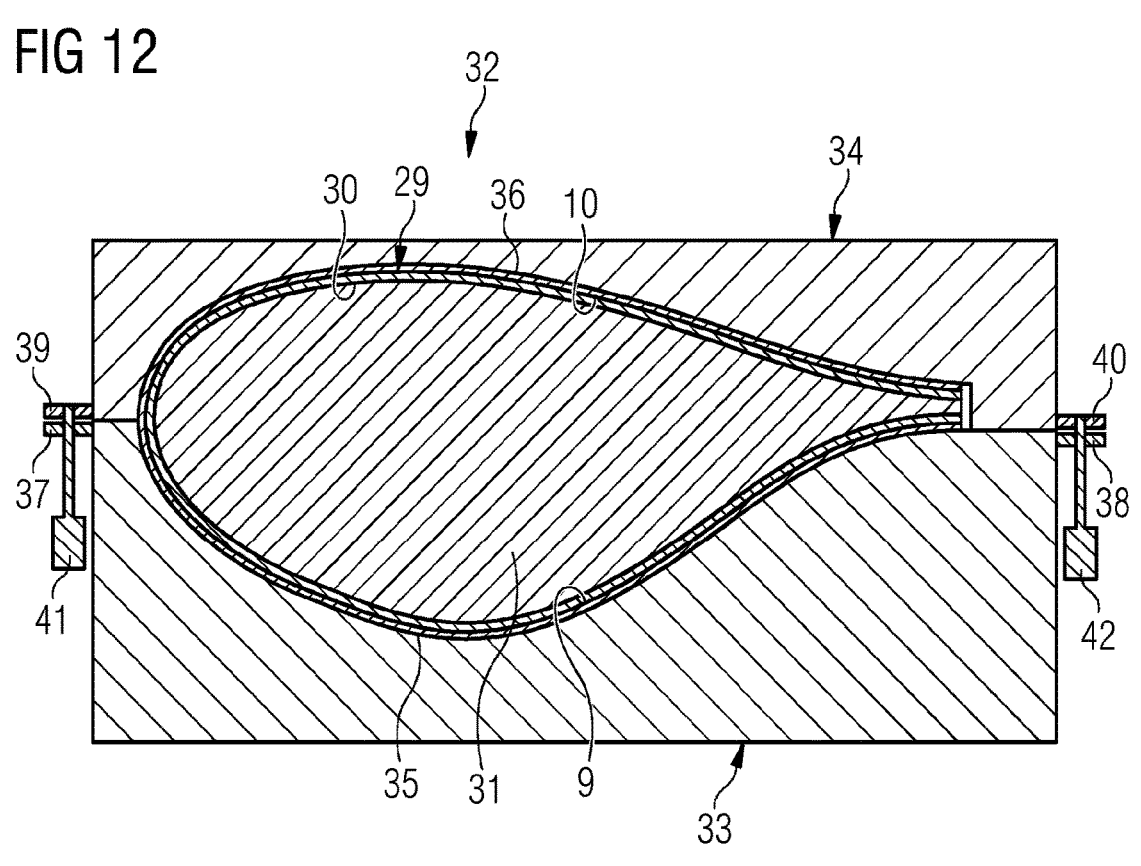
FIG. 12 shows a schematic cross-sectional view of a mold according to one embodiment.
Figure 13:
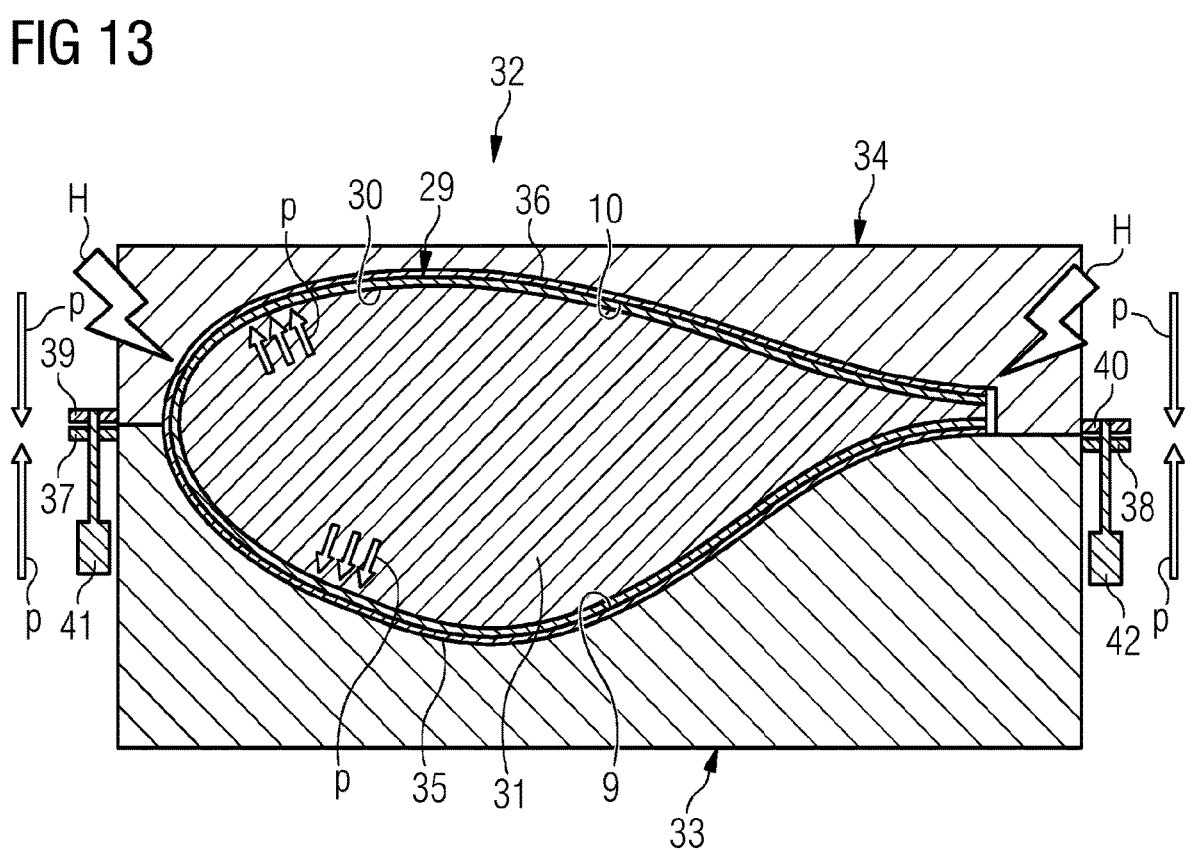
FIG. 13 shows a further schematic cross-sectional view of the mold according to FIG. 12.

FIG. 11 shows a schematic perspective partial view of the rotor blade 5 with a mold 32 for applying the pressure p to the joint 28. FIGS. 12 and 13 both show cross-sectional views of the mold 32. In the following, FIGS. 11 to 13 will be referred to at the same time.

During the final assembly of the rotor blade 5, for example on the construction site of the wind turbine 1, the rotor blade module 23 including the transversal stiffener 29 is placed inside the rotor blade module 25 so that the sloped interface sections 24, 26 match each other. This can be carried out by means of a transportation trolley or a crane system using slings.

The resistive element 27 or the resistive elements 27 (not shown) are either embedded or placed in the interface sections 24, 26. The resistive element 27 is at least partly exposed and connected for the application of the electrical current. "Exposed" in this context means that the matrix is partly removed from the resistive element 27 to electrically connect it to a power source.

The mold 32 is a support or can be referred to as support. The mold 32 has a base support or lower mold shell 33 for supporting the floor-facing first half-shell 9. The lower mold shell 33 is used to support the rotor blade 5 in the area of the joint 28. The lower mold shell 33 has the negative shape of the floor-facing first half-shell 9. The lower mold shell 33 is constructed to withstand the pressure p and avoid damaging the blade laminates. The lower mold shell 33 has a cavity 35 that is a negative of the first half-shell 9. The cavity 35 might have a composite surface or any other material able to withstand the pressure p and avoid damage to the joint 28.

The mold 32 further comprises a top support or upper mold shell 34. The upper mold shell 34 has a cavity 36 that is a negative of the second half-shell 10. The upper mold shell 34 has the shape of the profile of the joint 28. After placing the rotor blade modules 23, 25 on the lower mold shell 33, the upper mold shell 34 is placed on the lower mold shell 33 sandwiching the rotor blade modules 23, 25 between the mold shells 33, 34.

The cavity 36 might also have a composite surface or any other material able to withstand the pressure p and avoid damage to the joint 28. The upper mold shell 34 can then be clamped to the lower mold shell 33 by means of clamps 37 to 40. The lower mold shell 33 has two clamps 37, 38. The upper mold shell 34 has also two clamps 39, 40. The clamps 37 to 40 might be compressed using hydraulic cylinders 41, 42, for example. There can be one hydraulic cylinder 41, 42. There can also be two hydraulic cylinders 41, 42. The hydraulic cylinders 41, 42 will transfer the required pressure p to the perimeter of the joint 28.

The hydraulic cylinders 41, 42 are then powered and the target pressure p is applied to the entire area of the joint 28 to be welded. The internal transversal stiffener 29 will react to the applied pressure p, creating the needed counterpressure or internal pressure p to have a dimensionally stable joint 28. Due to the reaction forces caused by the internal transversal stiffener 29, the required perimetral pressure p normal to the surface at every point is created throughout the weld line. The resistive element 27 is then connected and electrical current is passed through it, performing the thermoplastic welding process by applying heat H to the interface sections 24, 26 (not shown).

Once cooled down, the resulting joint 28 is a scarf joint where the laminate comprises a single matrix and the rotor blade 5 is a single body, ready for use. The transversal stiffener 29 remains in the rotor blade 5 as a structural element. An exposed joint line of the joint 28 might be overlaminated to avoid ingress of fluids or undesirable substances and/or sealed and painted.

Figure 14:
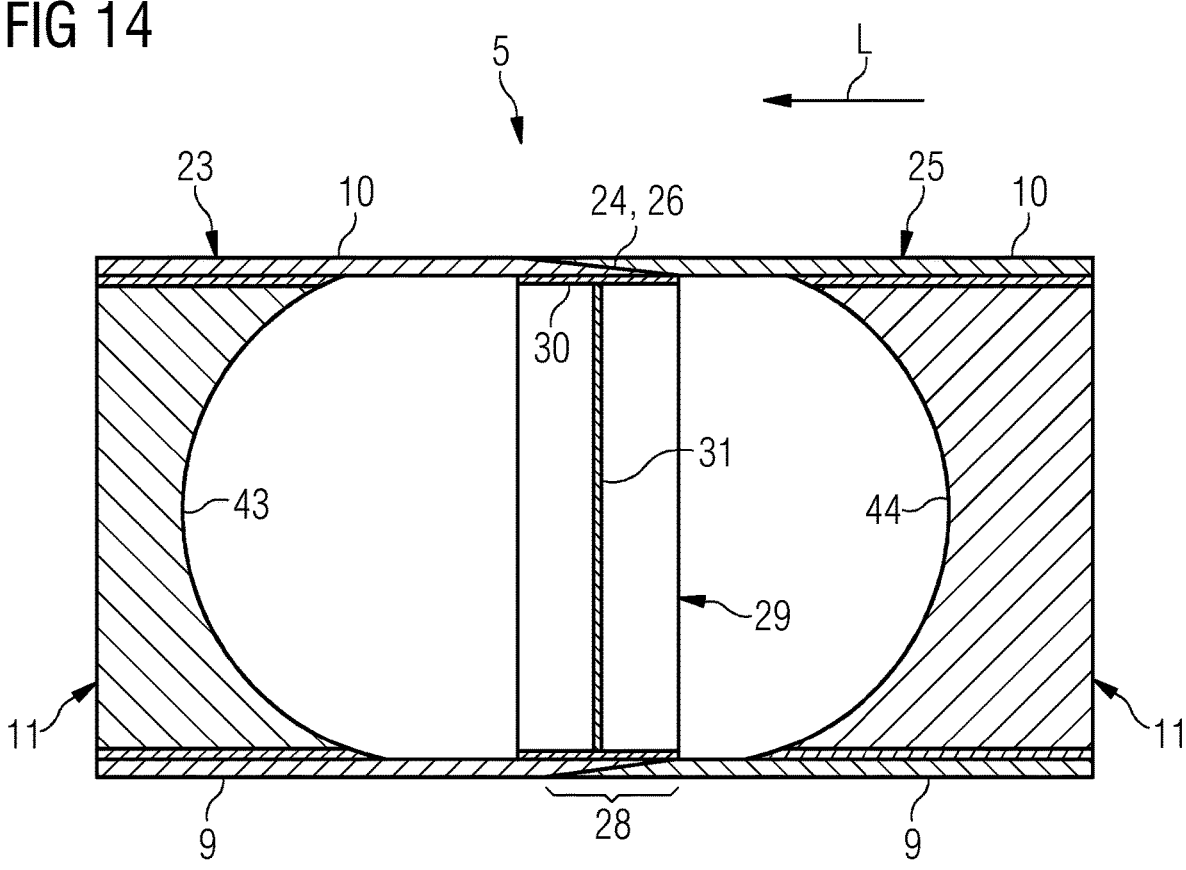
FIG. 14 shows a schematic cross-sectional view of a rotor blade according to another embodiment.

FIG. 14 shows a cross-sectional view of another embodiment of the rotor blade 5.

In a further development of the rotor blade 5, the structural elements 11, 12, in particular shear webs, are provided with cutouts 43, 44 at the respective sides of the joint 28. The cutouts 43, 44 can have a circular shape. However, the cutouts 43, 44 can have any desirable shape. The shear loads at the location of the joint 28 can be passed through the transversal stiffener 29 to guarantee the structural integrity of the rotor blade 5.

Figure 15:
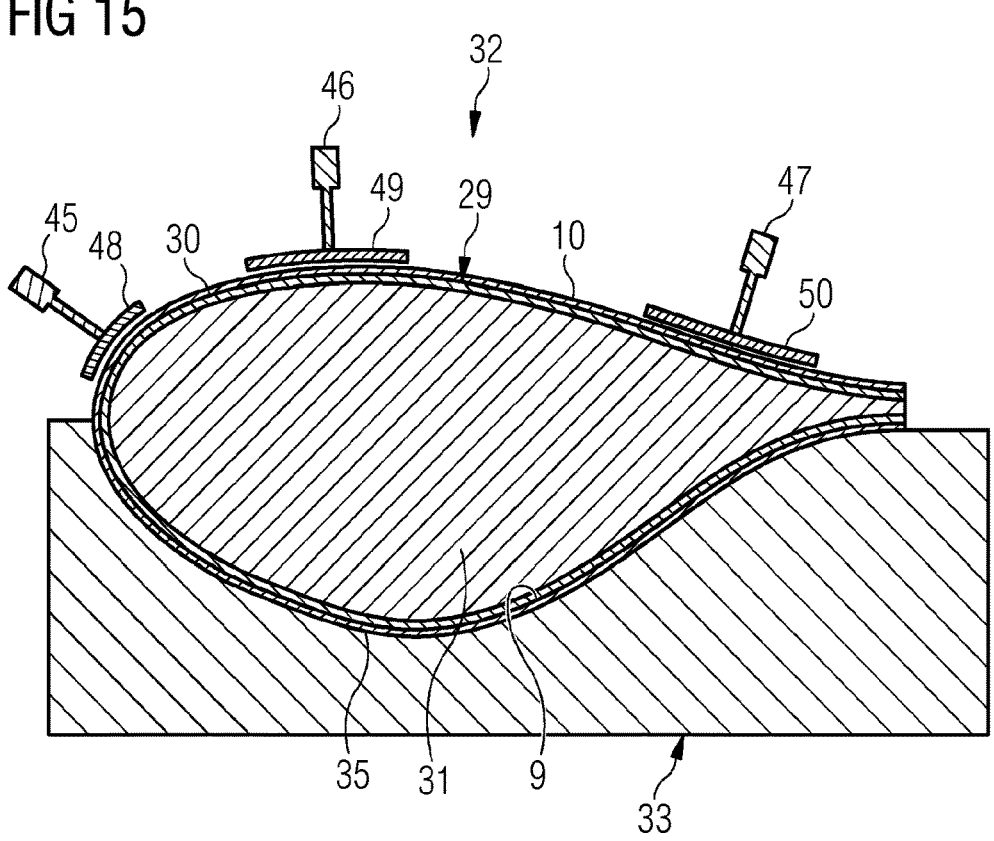
FIG. 15 shows a cross-sectional view of a mold according to another embodiment.
Figure 16:
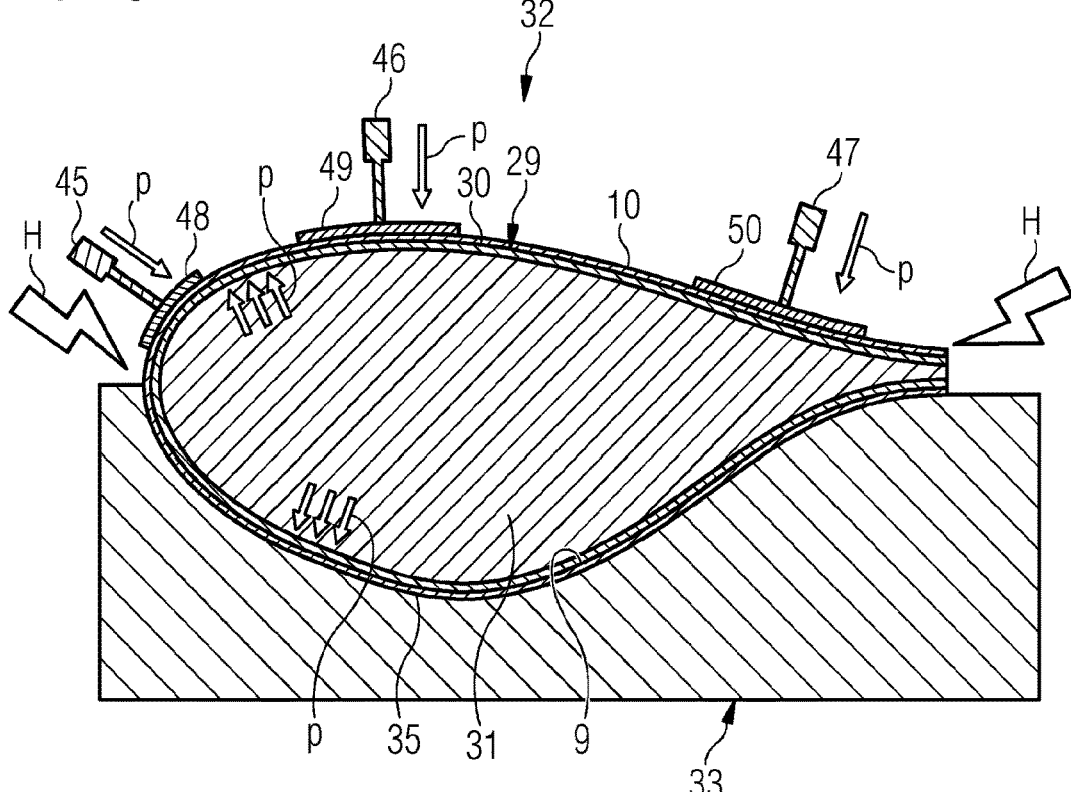
FIG. 16 shows a further cross-sectional view of the mold according to FIG. 15.

FIGS. 15 and 16 both show cross-sectional views of another embodiment of a mold 32 as explained before. In the following, FIGS. 15 and 16 will be referred to at the same time.

In this embodiment, the mold 32 only has a lower mold shell 33 as explained before. The pressure p is applied to the second half-shell 10 by means of hydraulic cylinders 45 to 47 or the like. The number of hydraulic cylinders 45 to 47 is arbitrary. There can be provided three hydraulic cylinders 45 to 47. Each hydraulic cylinder 45 to 47 has a pad 48 to 50 that is shaped to match the contour of the second half-shell 10. The pads 48 to 50 distribute the pressure p evenly. The pads 48 to 50 can have a rectangular, a circular, an elliptical or any needed shape.

The hydraulic cylinders 45 to 47 can be mounted to a frame (not shown) to be portable and to be fixed in place. The number and the location of the hydraulic cylinders 45 to 47 is chosen such as to generate a sufficient and even pressure p on the welding region.

As shown in FIG. 16, the hydraulic cylinders 45 to 47 are lowered and the target pressure p is applied to the entire area of the joint 28 (not shown) to be welded. Due to the reaction forces caused by the opposing transversal stiffener 29, the required perimetral pressure p normal to the surface at every point is created throughout the weld line. The resistive element 27 (not shown) is then connected and an electrical current is passed through it, performing the thermoplastic welding process by applying heat H to the interface sections 24, 26 or the joint 28.

Figure 17:
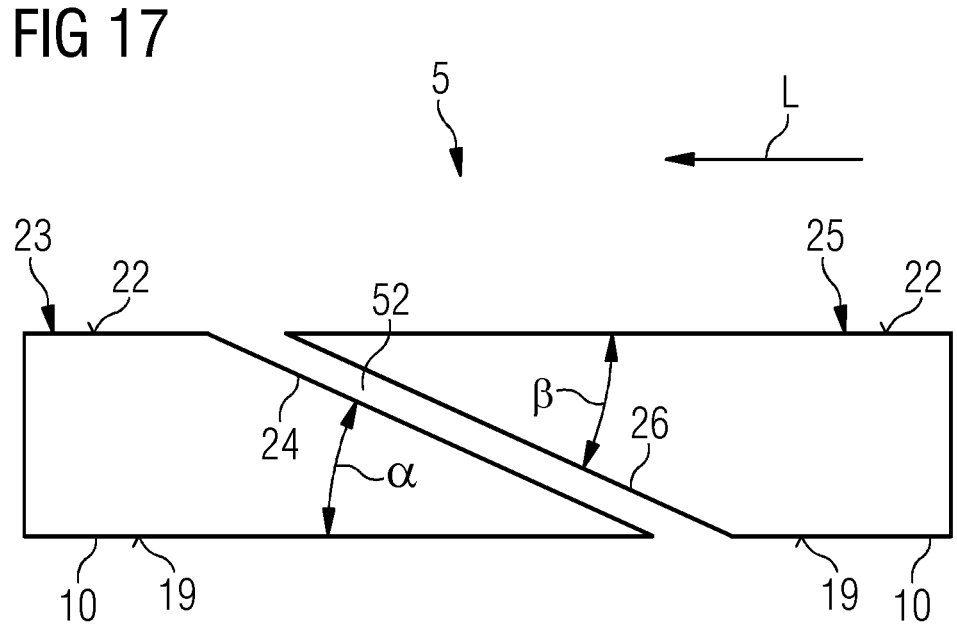
FIG. 17 shows a further schematic cross-sectional view of the rotor blade according to FIG. 2.
Figure 18:
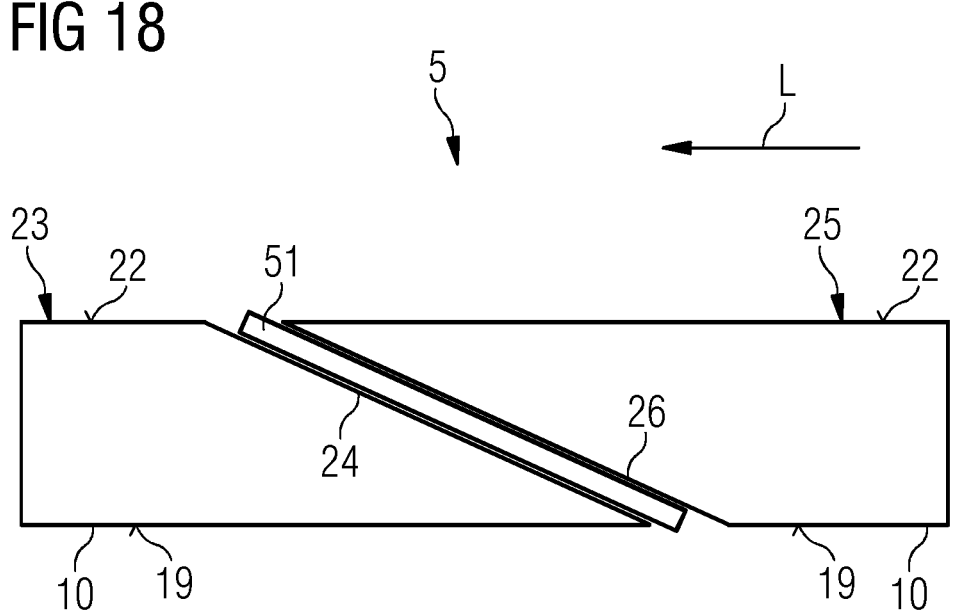
FIG. 18 shows a further schematic cross-sectional view of the rotor blade according to FIG. 2.

FIGS. 17 and 18 both show further cross-sectional views of the rotor blade 5 being cut perpendicular to the interface sections 24, 26. In the following, FIGS. 17 and 18 will be referred to at the same time.

Depending on the types of materials and processes used in manufacturing the rotor blade 5, some tolerance mismatch can happen between the rotor blade modules 23, 25 at the sloped interface sections 24, 26. To solve this problem, a resin strip 51 containing a weldable thermoplastic resin and/or a weldable thermoset resin M as mentioned before can be used at the sloped interface section 24, 26 to fill a gap 52 created between the interface sections 24, 26 by any possible mismatch. The resin strip 51 can comprise a resistive element 27 (not shown) as explained before.

Under the pressure p and heat H provided by means of the resistive element 27, the material of the resin strip 51 will melt resulting in the joint 28 being homogeneous and continuous. The resin strip 51 is not fiber reinforced. However, the resin strip 51 can also be fiber reinforced.

Figure 19:
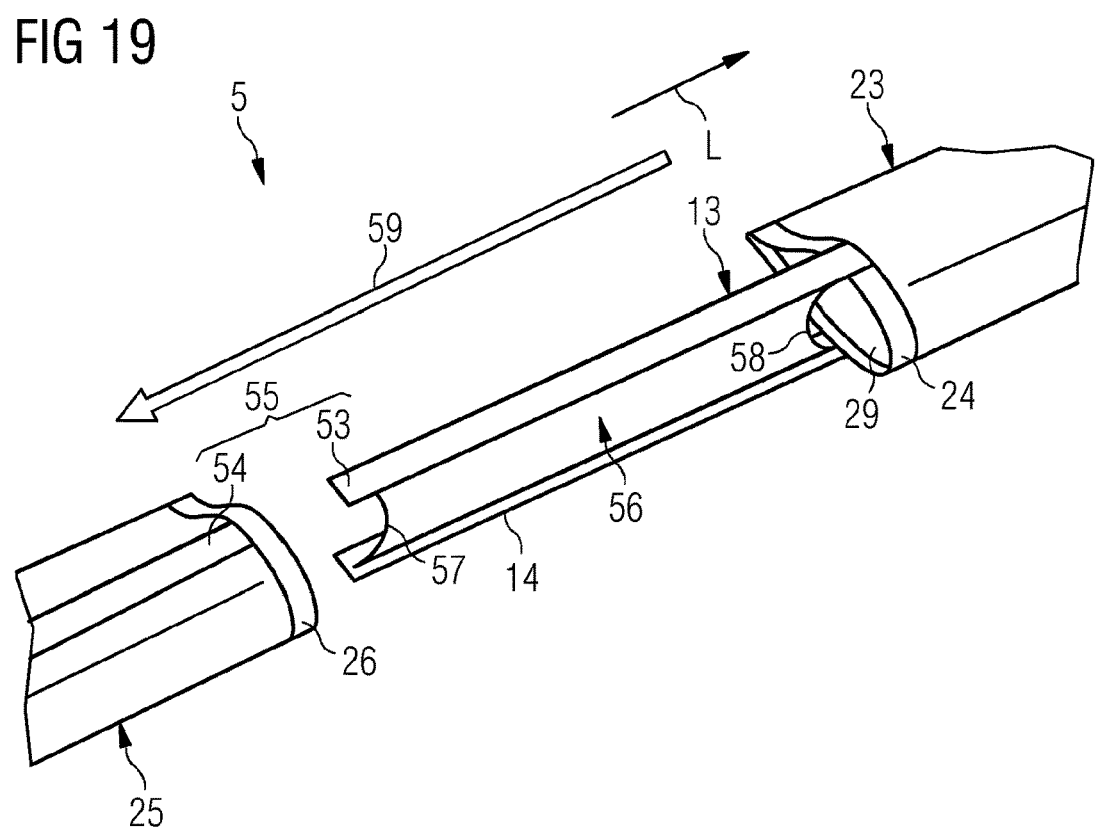
FIG. 19 shows a schematic exploded view of a rotor blade according to another embodiment.
Figure 20:
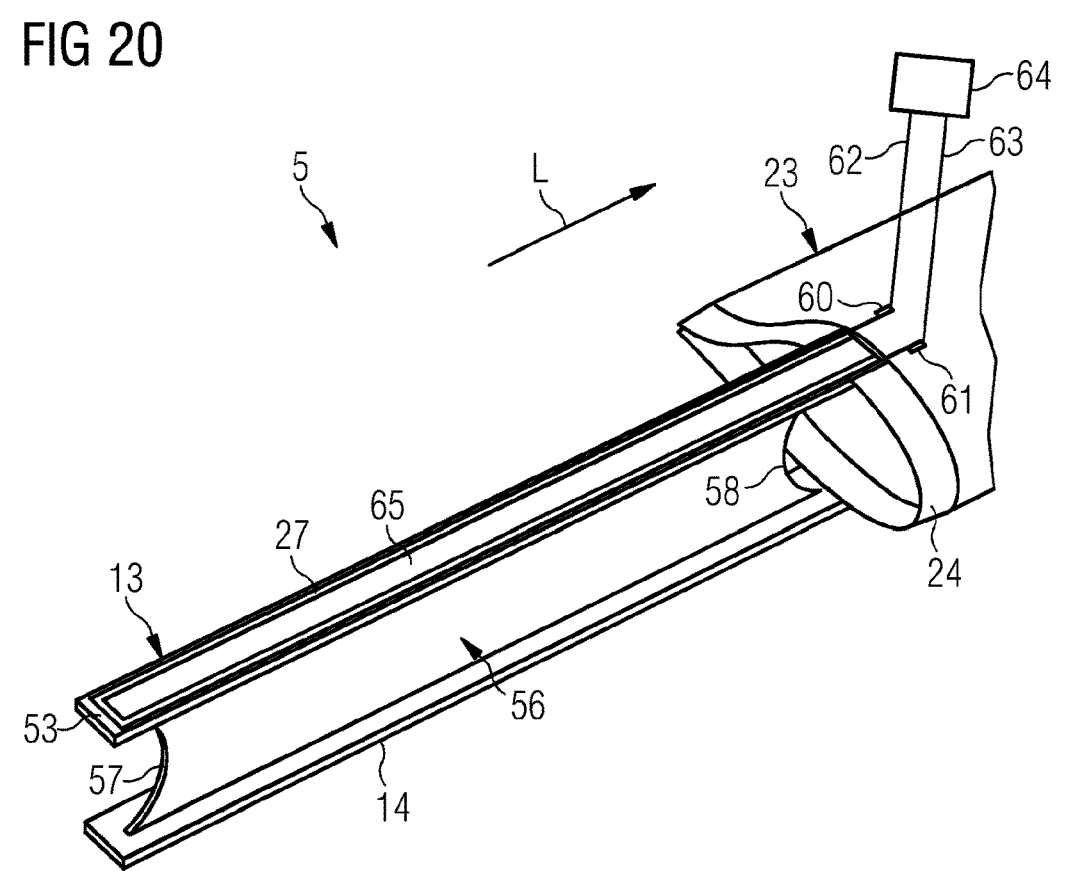
FIG. 20 shows a further schematic exploded view of the rotor blade according to FIG. 19.

FIG. 19 shows a perspective exploded view of a rotor blade 5 according to another embodiment. FIG. 20 shows a further perspective exploded view of the rotor blade 5. In the following, FIGS. 19 and 20 will be referred to at the same time.

Given the structural design of the rotor blade 5 as explained before with reference to FIGS. 3 and 4, if the joint 28 is located further from the tip of the rotor blade 5 it can be necessary that the load-bearing spar caps 13, 14 require a longer, less pronounced slope in the joint 28, because the load introduction at the joint 28 shall be smoother.

To segment and join the rotor blade 5 at a central portion of the rotor blade 5 can bring higher benefits in cost, transportation, and logistics in-field. The afore-described method enables to join the segmented rotor blade 5 at any location.

Each spar cap 13, 14 of the rotor blade module 23 has a sloped interface section 53 at its end. The rotor blade module 25 has a corresponding interface section 54. The interface sections 53, 54 together form a joint 55 that runs along the longitudinal direction L. The joint 55 is a scarf joint, too. The interface sections 53, 54 can be referred to as second interface sections. The joint 55 can be referred to as second joint. The interface sections 53, 54 can also be referred to as sloped interface sections.

Compared to the interface sections 24, 26, the interface sections 53, 54 are less steep. The interface sections 24, 26 can have a steep transition ratio of 1:8 or 1/8 whereas the interface sections 53, 54 can have a smooth transition ratio of 1:100 or 1/100, for example. "Ratio" in this context means the ratio between thickness and length of the corresponding interface section 24, 26, 53, 54.

The ends of the spar caps 13, 14 comprising the interface section 53 are supported by means an additional longitudinal stiffener 56 or shear web. The longitudinal stiffener 56 can have cutouts 57, 58 at its beginning and/or at its end. This longitudinal stiffener 56 acts as a welding support to the interface sections 53, 54 of the spar caps 13, 14 for the application of the pressure p for welding in the same manner as the transversal stiffener 29 does. The interface sections 53, 54 comprises a thermoplastic resin and/or weldable thermoset resin M as the interface sections 24, 26 do.

The sloped shape of the interface sections 53, 54 can be constructed by means of a ply-drop in case of infused dry fabrics. It can also be machined in case of solid components such as pultrusions, using unidirectional glass or carbon fibers. The rest of the glass laminate at the half-shells 9, 10 is sloped using the more aggressive ratio of 1:8, for example.

The sloped spar caps 13, 14 with the interface section 53 protrude from the rotor blade module 23 or from the rotor blade module 25. The corresponding, opposite interface section 54 is constructed in ends of the spar caps 13, 14 at the other rotor blade module 25.

The sloped spar caps 13, 14 and the longitudinal stiffener 56 are then be inserted into the rotor blade module 25 as indicated by means of an arrow 59 in FIG. 19. The joints 28, 55 are formed at the laminate of the half-shells 9, 10 both at the steep sloped interface sections 24, 26 and at the smooth sloped interface sections 53, 54.

Surfaces of the interface sections 24, 26, 53, 54 can be prepared just before insertion of the spar caps 13, 14 and the longitudinal stiffener 56 into the rotor blade module 25 for the corresponding welding process that can include resistance, induction and/or chemical welding.

In FIG. 20 the rotor blade module 25 is not shown. A resistive element 27 as explained before is placed on the interface section 53 or embedded in the interface section 53. The resistive element 27 has two connection points 60, 61. The connection points 60, 61 are electrically connected to two poles 62, 63 of an electrical power source 64. The resistive element 27 is routed on top of the welding surface, namely the interface section 53, of the spar caps 13, 14, having both connection points 60, 61 exposed at the location of the joint 28 for easy electrical connection to the electrical power source 64.

An insulating material 65 is placed in between the mesh routes of the resistive element 27 or on top of the resistive element 27 to avoid arching. The insulating material 65 can be the weldable resin itself. The insulating material 65 can comprise a weldable thermoplastic resin and/or a weldable thermoset resin M as mentioned before. The resistive element 27 can be embedded in the insulating material 65. The resistive welding process can be performed as described before.

Once both rotor blade modules 23, 25 of the segmented rotor blade 5 are connected, the joints 28, 55 in form of continuous scarf joints are established at both the perimeter of the outer blade shell 15 and the length of the spar caps 13, 14. The stiffeners 29, 56 under each joint 28, 55 in both transversal and longitudinal direction L will serve as supports for the welding load application in both joints 28, 55.

Figure 21:
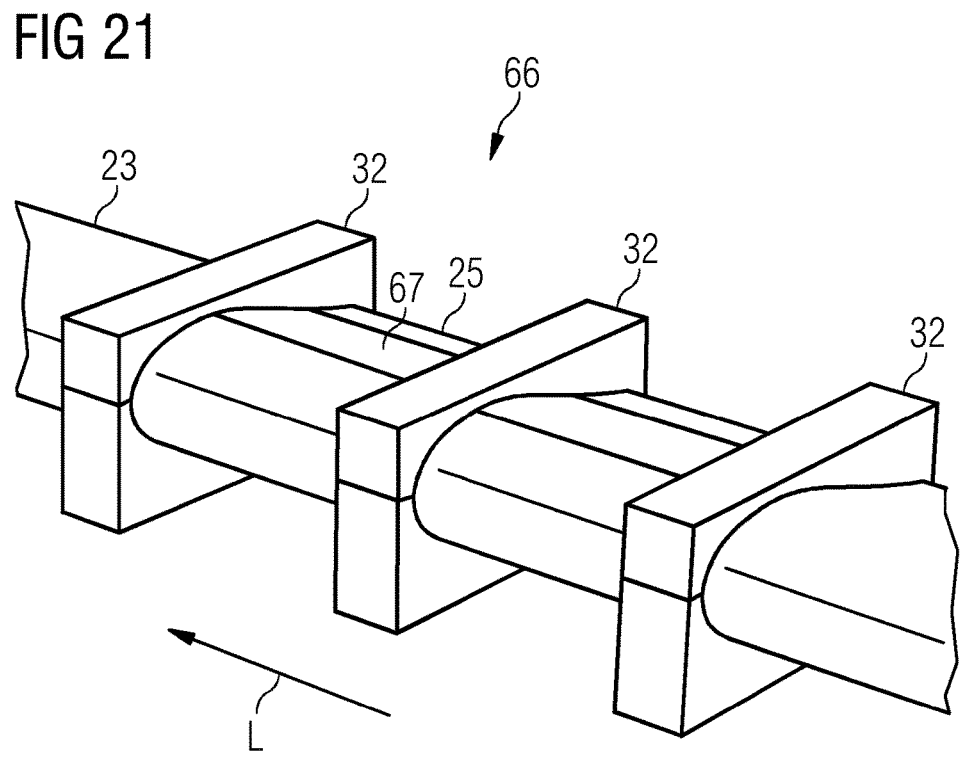
FIG. 21 shows a schematic perspective view of a mold arrangement according to one embodiment.
Figure 22:
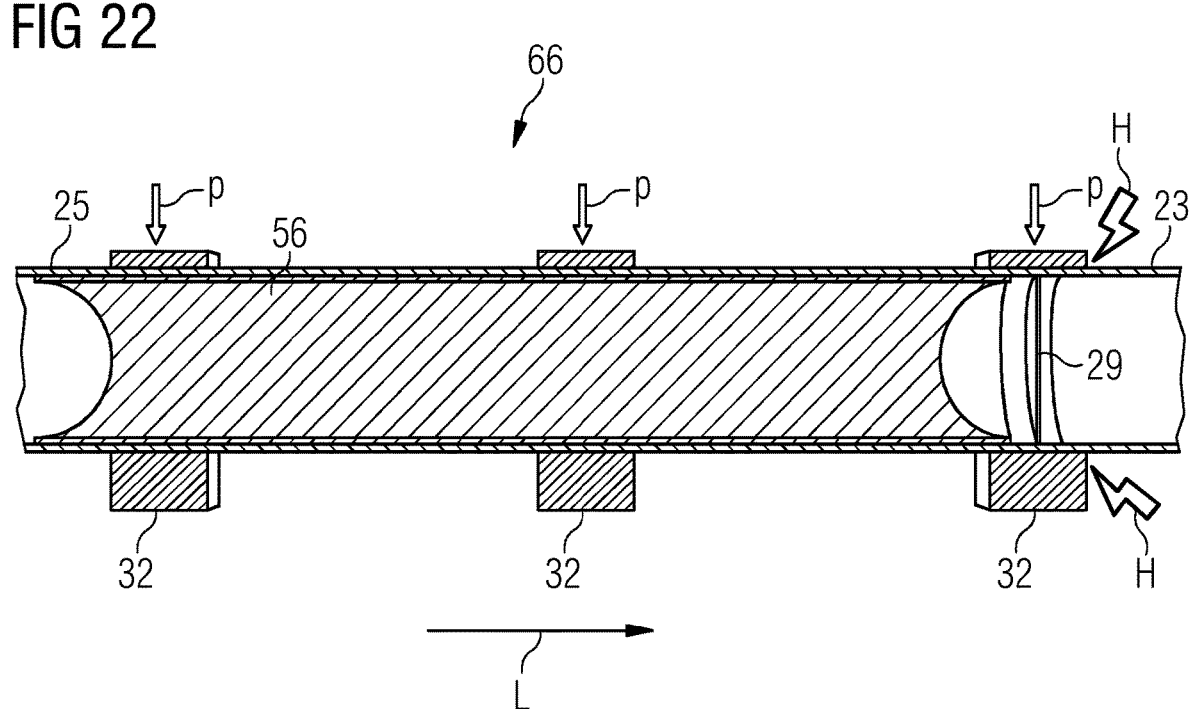
FIG. 22 shows a schematic cross-sectional view of the mold arrangement according to FIG. 21.

FIG. 21 shows a schematic perspective view of one embodiment of a mold arrangement 66 for connecting the rotor blade modules 23, 25. FIG. 22 shows a cross-sectional view of the mold arrangement 66. In the following, FIGS. 21 and 22 will be referred to at the same time.

The mold arrangement 66 comprises a plurality of molds 32 as explained before. The molds 32 are arranged in a distance from each other along the longitudinal direction L. The molds 32 cover the length of the joints 28, 55. The mold arrangement 66 can include a longitudinal extension 67 to distribute the pressure p evenly on top of the spar cap 13.

The welding of the interface sections 24, 26 and the interface sections 53, 54 at the spar caps 13, 14 both happen at the same process stage. Once welded, a continuous laminate is then formed in both joints 28, 55. The transversal stiffener 29 and the longitudinal stiffener 56 then remain in the rotor blade 5, acting as shear webs and fully functional structural elements.

Figure 23:
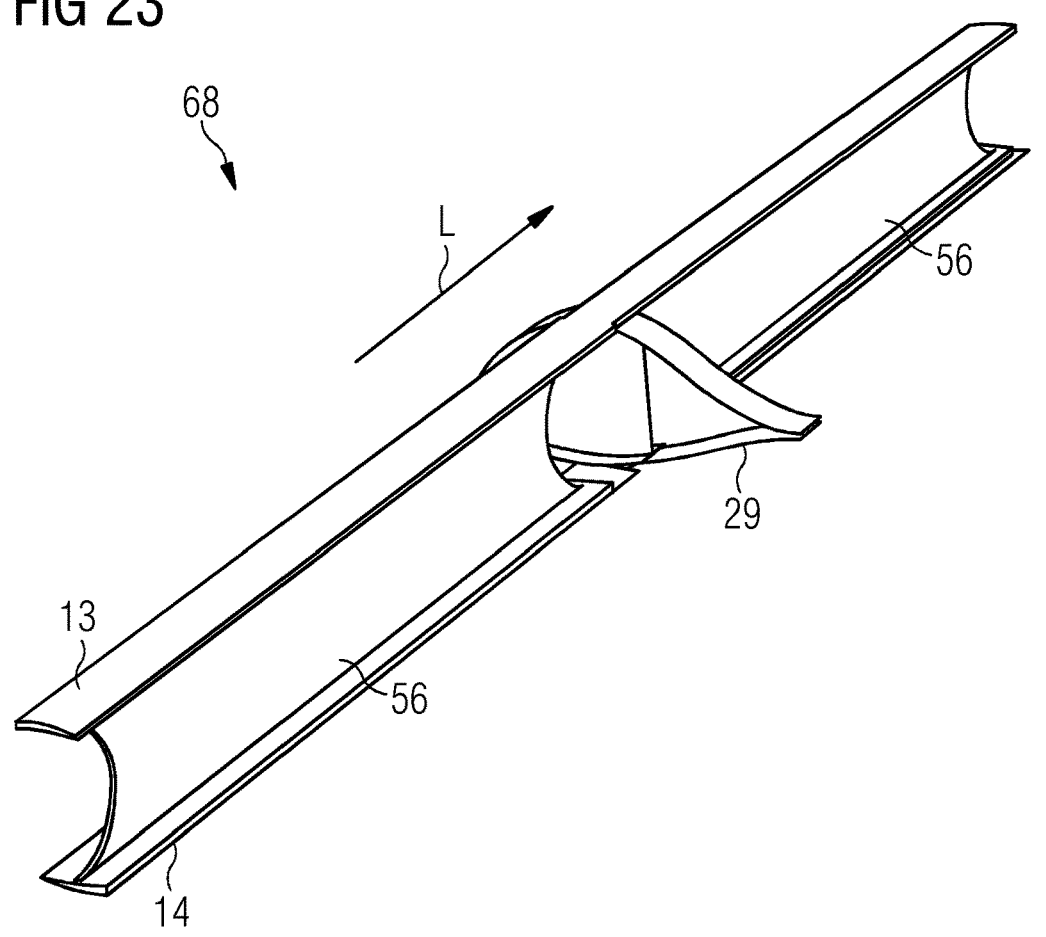
FIG. 23 shows a schematic perspective view of a joining component according to one embodiment.

FIG. 23 shows a schematic perspective view of one embodiment of a joining component 68.

The joining component 68 is preassembled and comprises the sloped spar caps 13, 14 with interface sections 53 (not shown) as explained before, two longitudinal stiffeners 56 and one transversal stiffener 29 that is sandwiched between the longitudinal stiffeners 56 when seen along the longitudinal direction L.

The joining component 68 is designed to join the rotor blade modules 23, 25 together. The rotor blade modules 23, 25 and the joining component 68 are transported separately. The joining component 68 is then inserted into both rotor blade modules 23, 25 and joined by means of resistive welding as explained before.

Figure 24:
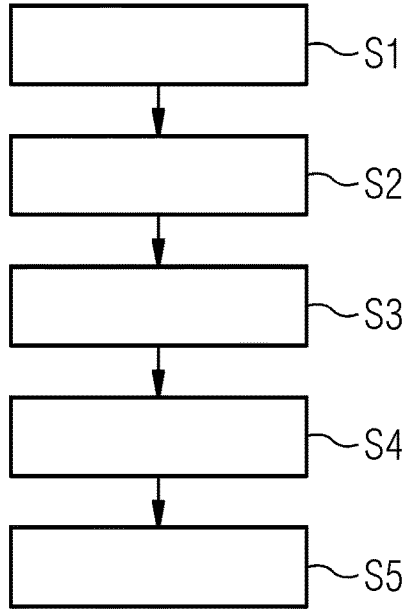
FIG. 24 shows a flowchart of one embodiment of a method for assembling the rotor blade according to FIG. 2.

FIG. 24 shows a flowchart of one embodiment of a method for assembling the rotor blade 5.

In a step S1, at least two different rotor blade modules 23, 25 that segment the rotor blade 5 along the longitudinal direction L thereof are provided. Step S1 can include manufacturing the rotor blade modules 23, 25. The number of rotor blade modules 23, 25 is arbitrary. As mentioned before, each rotor blade module 23, 25 has an interface section 24, 26, 53, 54, wherein the interface sections 24, 26, 53, 54 comprise the weldable thermoplastic resin and/or a weldable thermoset resin M. The weldable thermoplastic resin and/or the weldable thermoset resin M can be referred to as matrix or matrix material. The interface sections 24, 26, 53, 54 are sloped or inclined.

In a step S2, the resistive element 27 is provided. Step S2 can include manufacturing the resistive element 27. Step S2 can also include embedding the resistive element 27 or more than one resistive element 27 in one or more than one of the interface sections 24, 26, 53, 54.

In a step S3, the rotor blade modules 23, 25 and the resistive element 27 or the resistive elements 27 are arranged in such a way that the interface sections 24, 26, 53, 54 face each other or lay against each other and the resistive element 27 is sandwiched between the interface sections 24, 26, 53, 54. In step S3, the resin strip 51 comprising the weldable thermoplastic resin and/or the weldable thermoset resin M can be placed between the interface sections 24, 26, 53, 54.

In a step S4, the resistive element 27 is energized to apply heat H to the weldable thermoplastic resin and/or the weldable thermoset resin M to melt or to soften it. This can be done by means of connecting the resistive element 27 to the power source 64.

In a step S5, the interface sections 24, 26, 53, 54 are joined together at the joints 28, 55 by means of the molten or softened weldable thermoplastic resin and/or the weldable thermoset resin M to form the rotor blade 5.

The steps S1 to S5 can be performed subsequently or at least partly simultaneously. The pressure p is applied to the interface sections 24, 26, 53, 54 during steps S4 and/or S5. The pressure p can be applied by means of the mold 32 and/or the mold arrangement 66 that covers the joint 28, 55.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for assembling a rotor blade of a wind turbine, the method comprising:
   a) providing at least two different rotor blade modules that segment the rotor blade along a longitudinal direction thereof, wherein each rotor blade module has a sloped interface section, and wherein the sloped interface sections comprise a weldable thermoplastic resin and/or a weldable thermoset resin;

b) providing a resistive element;

c) arranging the at least two different rotor blade modules and the resistive element in such a way that the sloped interface sections face each other and the resistive element is sandwiched between the sloped interface sections;

d) energizing the resistive element to apply heat to the weldable thermoplastic resin and/or the weldable thermoset resin to melt or to soften the weldable thermoplastic resin and/or the weldable thermoset resin; and e) joining the sloped interface sections together at a joint by means of the molten or softened weldable thermoplastic resin and/or the weldable thermoset resin to form the rotor blade;

wherein a transversal stiffener that runs perpendicular to the longitudinal direction is provided for supporting the sloped interface sections from an inner space of the rotor blade.

2. The method according to claim 1, wherein the resistive element is embedded in at least one of the sloped interface sections.

3. The method according to claim 1, wherein the resistive element is wires or a mesh.

4. The method according to claim 1, wherein a resin strip comprising a weldable thermoplastic resin and/or a weldable thermoset resin is placed between the sloped interface sections during step c).

5. The method according to claim 1, wherein pressure is applied to the sloped interface sections during step d) and/or e).

6. The method according to claim 5, wherein the pressure is applied by means of a mold that covers the joint.

7. The method according to claim 1, wherein a first joint is formed during step e), wherein the first joint runs perpendicular to the longitudinal direction, and wherein the first joint runs around a circumference of an outer blade shell of the rotor blade.

8. The method according to claim 7, wherein a second joint is formed during step e), wherein the second joint runs parallel to the longitudinal direction, and wherein the second joint runs along a spar cap of the rotor blade.

9. The method according to claim 8, wherein the first joint is formed between first sloped interface sections of the rotor blade modules, wherein the second joint is formed between second sloped interface sections of the rotor blade modules, and wherein the first sloped interface sections are steeper than the second sloped interface sections.

10. The method according to claim 9, wherein the first sloped interface sections have a thickness/length ratio of 1/8, and wherein the second sloped interface sections have a thickness/length ratio of 1/100.

11. The method according to claim 1, wherein a longitudinal stiffener that runs parallel to the longitudinal direction is provided for supporting the sloped interface sections from the inner space of the rotor blade.

12. The method according to claim 11, wherein the transversal stiffener and the longitudinal stiffener together form a preassembled joining component that is inserted into the rotor blade modules during step a) or c).

13. The method according to claim 1, wherein the resistive element is covered by an insulating material, and wherein the insulating material comprises a weldable thermoplastic resin and/or a weldable thermoset resin.

14. The method according to claim 1, wherein the resistive element remains in the rotor blade after step e).

*    *    *    *    *